US000001810H

United States Statutory Invention Registration [19]

[11] Reg. Number: H1,810

Van De Velde

[45] Published: Nov. 2, 1999

[54] VALVE ASSEMBLY

[76] Inventor: Paul J. Van De Velde, Bellingham, Wash.

[21] Appl. No.: 08/967,063

[22] Filed: Nov. 10, 1997

[51] Int. Cl.[6] ..... F17D 00/00

[52] U.S. Cl. ..... 137/599

[58] Field of Search ..... 137/599.1, 595, 137/607, 599; 251/250.5

[56] References Cited

U.S. PATENT DOCUMENTS

| | | | |
|---|---|---|---|
| 1,995,882 | 3/1935 | Culp | 251/250.5 |
| 2,482,873 | 9/1949 | Roberts | 251/250.5 |
| 3,154,485 | 10/1964 | Liddell | 210/340 X |
| 4,665,629 | 5/1987 | Cramer | 137/595 |
| 4,921,598 | 5/1990 | Desch | 137/599.1 |

*Primary Examiner*—Charles T. Jordan
*Assistant Examiner*—Meena Chelliah

[57] ABSTRACT

A valve assembly includes a first valve having a first valve stem configured for controlling operation of the first valve, and a second valve having a second valve stem configured for controlling operation of the second valve. A linkage is provided for interconnecting the first and second valve stems so that rotation of the first valve stem rotates the second valve stem, and thereby operates the first and second valves.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

VALVE ASSEMBLY

FIELD OF THE INVENTION

The invention relates generally to valves and, more particularly, to a plurality of valves assembled together for synchronized operation.

BACKGROUND OF THE INVENTION

Equipment with moving parts, such as rotating or reciprocating compressors, are generally provided with lubrication systems. Such lubrication systems typically comprise a pump that circulates lubricant through the equipment, and a filter that removes impurities that accumulate in the lubricant. When such equipment is to be continuously operated, the lubrication system must be particularly reliable and, to that end, often includes dual filters. When dual filters are used, one is typically on-line while the other is off-line. The on-line filter provides service to the equipment by filtering lubricant for the equipment, while the off-line filter is available for service if needed, or may be cleaned or replaced as necessary.

Dual filters are typically interconnected between the equipment and the pump through a network of lines and valves which control which filter is on-line and which filter is off-line. As shown in FIG. 1, depicting the prior art, this may be achieved by a system 10 comprising conventional dual filters 12 and 14 interconnected via lines 16 and 18 to output ports 24*a* and 24*b* of a first three-way valve 24, and via lines 20 and 22 to input ports 26*a* and 26*b* of a second three-way valve 26. The valves 24 and 26 include input and output ports 24*c* and 26*c*, respectively, and valve stems 24*d* and 26*d*, respectively, operable for controlling flow through the respective output and input ports of the valves. A pump 30 and reciprocating compressor 32 are serially connected between the input port 24*c* and the output port 26*c*, and a rupture disc 34 is connected in parallel across the pump 30. The pump 30 circulates lubricant through the first valve 24, one of the filters 12 and 14, the second valve 26, and the compressor 32. In operation, the valves 24 and 26 must both be synchronized for directing fluid, such as a gas, liquid, slurry, or the like, to flow through either filter 12 or filter 14 as the on-line filter. It can be appreciated that when the filters 12 and 14 are switched between being on-line and off-line, the valves 24 and 26 must be turned simultaneously and synchronously or the system will be blocked ("dead-headed"). As a consequence, pressure will build up and pop the rupture disc 34, causing the system 10 to lose pressure. The compressor 32 would then not receive lubrication until the rupture disc 34 was replaced, thereby necessitating a shut down of the compressor 32 before it overheated and failed, resulting in substantial down-time costs.

Therefore, what is needed is a system and method wherein filters or subsystems thereof may switched between being on-line and off-line without incurring the risk that the system will be blocked and necessitate a shut-down of the system.

SUMMARY OF THE INVENTION

The present invention, accordingly, provides a system and method wherein sub-systems, such as filters, may be switched between being on-line and off-line without incurring the risk that the system will be blocked. Accordingly, the present invention comprises a valve assembly comprising a first valve having a first valve stem configured for controlling operation of the first valve, and a second valve having a second valve stem configured for controlling operation of the second valve. A linkage is provided for interconnecting the first and second valve stems so that rotation of the first valve stem rotates the second valve stem, and thereby operates the first and second valves.

In further accord with the present invention, a method for synchronously operating a plurality of valves, each of which valves includes a valve stem configured for controlling the operation of a respective valve, comprises the steps of linking the valve stems together so that rotation of one valve stem rotates the other valve stems, and rotating one of the valve stems, thereby synchronously rotating all of the valve stems.

DETAILED DESCRIPTION

Figure 1:
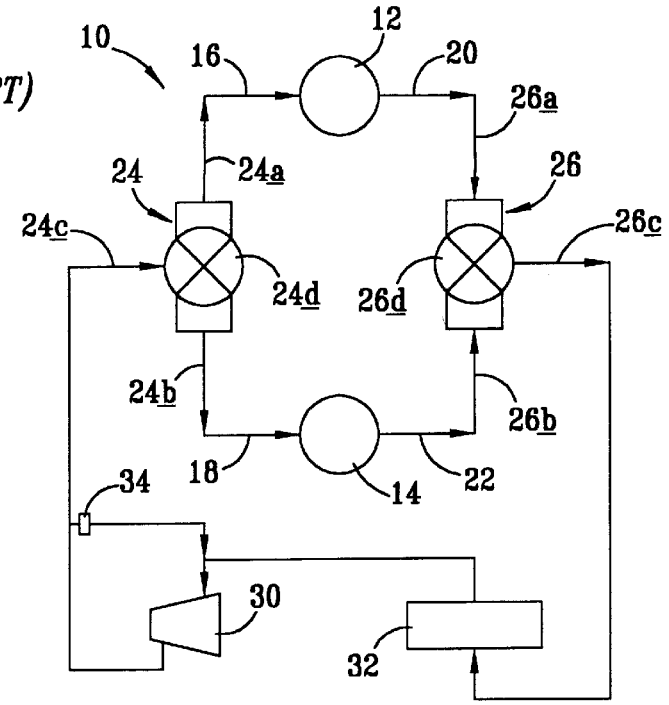
FIG. 1 (PRIOR ART)
FIG. 1 is a schematic view of a lubricating system of the prior art.
Figure 2:
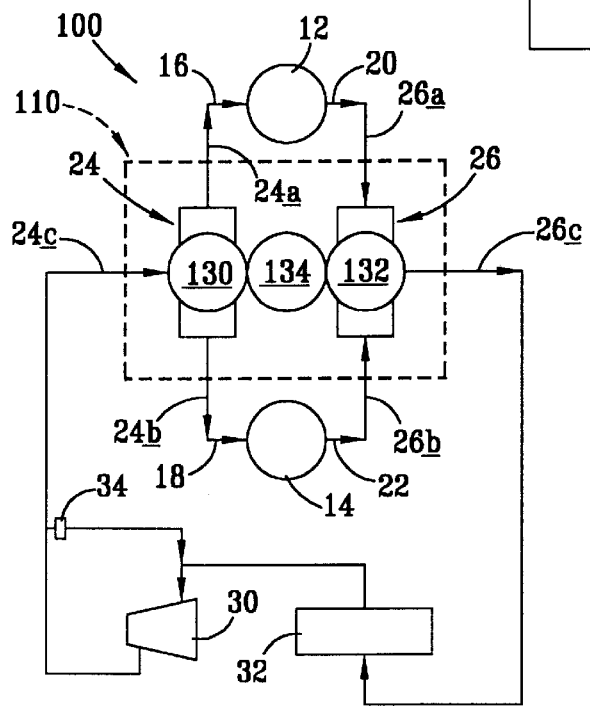
FIG. 2 is a schematic view of a system embodying features of the present invention.

In the discussion of the Figures, the same numbers will be used throughout to refer to the same or similar components. With reference to FIG. 2 of the drawings, the reference numeral 100 generally designates a system having a modified filter transfer valve assembly 110 comprising the first and second three-way valves 24 and 26, respectively. As described above, the valve 24 includes output ports 24*a* and 24*b* which are connected via the lines 16 and 18 to the filters 12 and 14, respectively, which filters are connected via the lines 20 and 22 to the input ports 26*a* and 26*b*, respectively, of the valve 26. The valves 24 and 26 include input and output ports 24*c* and 26*c*, respectively, and valve stems 24*d* and 26*d* (not shown in FIG. 2), respectively, operable for controlling flow through the respective input and output ports of the valves. The pump 30 and reciprocating compressor 32 are serially connected between the input port 24*c* and the output port 26*c*, and the rupture disc 34 is connected in parallel across the pump 30. The pump 30 circulates lubricant through the first valve 24, one of the filters 12 and 14, the second valve 26, and the compressor 32.

In addition to the foregoing, the valves 24 and 26 of the filter transfer valve assembly 110 also include first and second gears 130 and 132, respectively, -mounted on the valve stems 24*d* and 26*d*, respectively. As described in greater detail below, an intermediate gear 134 is mounted in the valve assembly 110 and meshes with both of the gears 130 and 132, so that rotation of the intermediate gear 134 also rotates of each of the gears 130 and 132.

Figure 3:
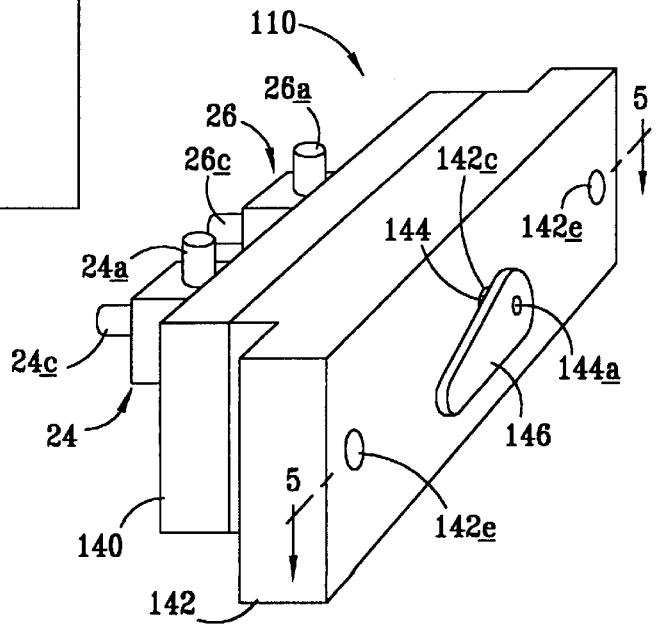
FIG. 3 is a perspective view of a valve assembly employed by the system of FIG. 2.
Figure 4:
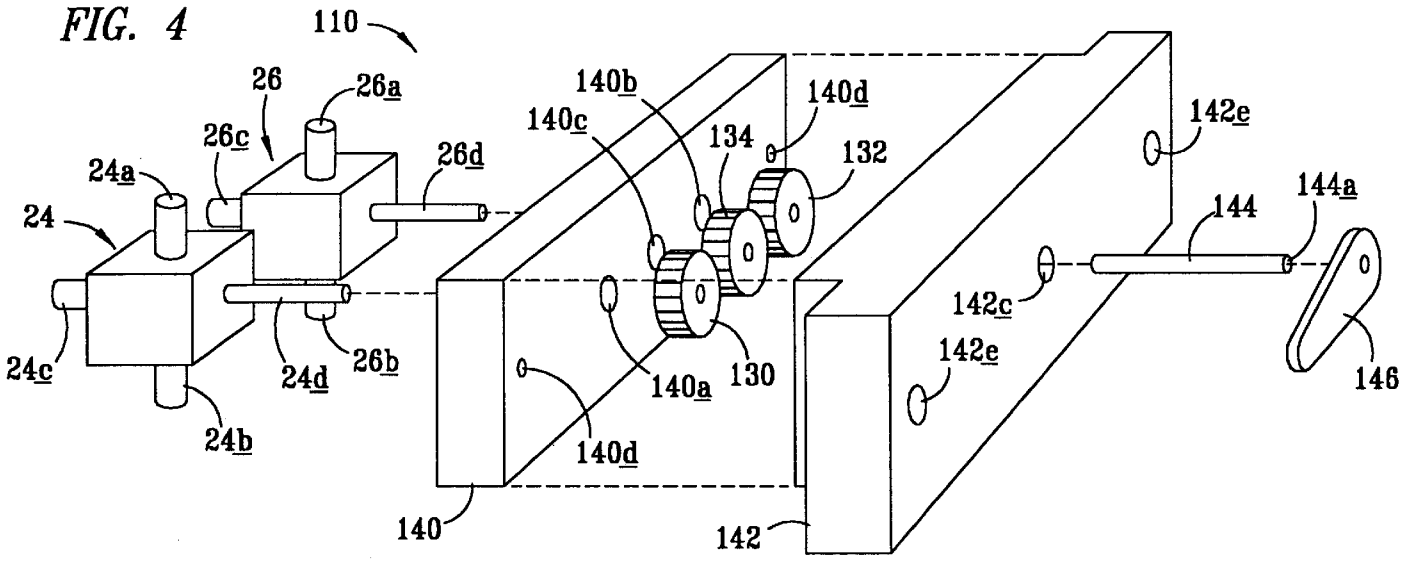
FIG. 4 is an exploded view of the valve assembly of FIG. 3.
Figure 5:
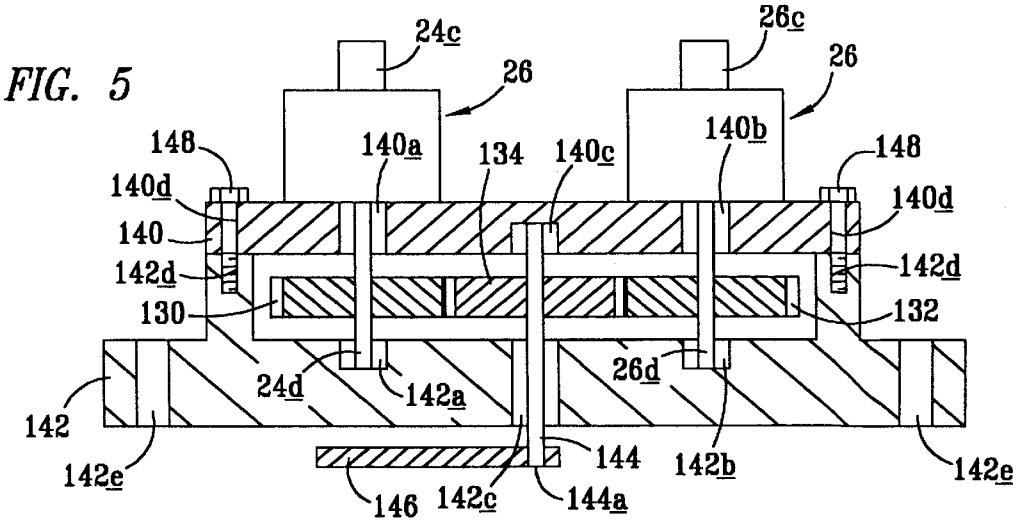
FIG. 5 is a cross-sectional view of the valve assembly of FIG. 3 taken along the line 5—5 of FIG. 3.

FIGS. 3, 4, and 5 illustrate perspective, exploded, and cross-sectional views, respectively, of the filter transfer valve assembly 110. As shown in FIGS. 3 and 5, the valves 24 and 26 are mounted on a rear panel 140 of a housing 142. As more clearly shown in FIGS. 4 and 5, the rear panel 140 defines first and second bores 140*a* and 140*b*, respectively, and the housing 142 defines corresponding first and second recesses 142*a* and 142*b*, respectively, for rotatably receiving and seating the respective valve stems 24*d* and 26*d*. The first and second gears 130 and 132, respectively, are mounted on the respective valve stems 24*d* and 26*d* within the interior of the housing 142. It is understood that, for the sake of clarity, the size of the bores 140*a* and 140*b* and of the recesses 142*a* and 142*b* with respect to the valve stems 24*d* and 26*d* is not drawn to scale, but is exaggerated, and that, because the internal workings of the valves 24 and 26 are well known, they not shown in the cross-section of FIG. 5.

The rear panel 140 further defines an intermediate recess 140*c*, and the housing 142 further defines an intermediate bore 142*c*, for rotatably receiving and seating an intermediate shaft 144. The intermediate gear 134 is mounted on the intermediate shaft 144 within the interior of the housing 142, such that it meshes with the first and second gears 130 and 132. The valves 24 and 26 are synchronized through the gears 130, 132, and 134 so that the ports 24*a* and 26*a* open and close together and, correspondingly, so that the ports 24*b* and 26*b* close and open together, and so that at all times either ports 24*a* and 26*a* are open or ports 24*b* and 26*b* are open. The intermediate shaft 144 includes an end 144*a* onto which is mounted a control lever 146 accessible to a user for rotating the intermediate shaft 144 and gear 134, as described below. It is understood that, for the sake of clarity, the size of the bore 142*c* and of the recess 140*c* with respect to the shaft 144 is not drawn to scale, but is exaggerated.

As further shown in FIG. 5, the rear panel 140 includes two bores 140*d* and the housing 142 includes two corresponding threaded recesses 142*d* for receiving bolts 148 for securing the rear panel to the housing. Additionally, the housing includes bores 142*e* through which bolts (not shown) may be extended for securing the filter transfer valve assembly 110 to a structure (not shown), such as a control panel.

In operation, and with reference to FIG. 2, the pump 30 circulates lubricant through the valve 24, one of the filters 12 or 14, the valve 26, and the reciprocating compressor 32. Whether lubricant is circulated through the filter 12 or the filter 14, ie., whether the filter 12 or the filter 14 is on-line, is determined by the filter transfer valve assembly 110 and, more specifically, by the position of the control lever 146, and the synchronization of the valves with respect to the position of the control lever. When the control lever 146 is positioned as shown in FIG. 3, the ports 24*a* and 26*a* are open, the ports 24*b* and 26*b* are closed, the first filter 12 is on-line, and the second filter 14 is off-line. To place the second filter 14 on-line, the control lever 146 is rotated approximately 180° to cause the gear 134 to rotate the gears 130 and 132 and the respective valve stems 24*d* and 26*d* so that, synchronously and simultaneously, the ports 24*a* and 26*a* are closed, and the ports 24*b* and 26*b* are opened, with the result that the first filter 12 is placed off-line and the second filter 14 is placed on-line. The first filter 12 may be placed back on-line, and the second filter 14 placed back off-line, by again rotating the control lever 146 approximately 180°. While the filter 12 or the filter 14 is off-line, it is available for service if needed, or may be cleaned or replaced as necessary.

The present invention has several advantages. For example, the filter transfer valve assembly 110 ensures that operation of the valves 24 and 26 is synchronized so that corresponding ports may be simultaneously opened and closed together, thereby preventing the potential for the system 100 to be "dead headed" (i.e., blocked), necessitating a shut-down of the system and costly downtime.

It is understood that the present invention can take many forms and embodiments. The embodiments described herein are intended to illustrate rather than to limit the invention. Accordingly, several variations may be made in the foregoing without departing from the spirit or the scope of the invention. For example, the valve assembly 110 may be used for controlling fluid flow through any of a number of different sub-systems other than the filters 12 and 14, such as an arrangement of dual pumps or compressors. The valves 24 and 26 may comprise valves other than three-way valves, such as ball valves, plug valves, and gate valves. If two-way valves are used, and they open and close at different rates, the gears 130, 132, and 134 may be configured as non-circular or elliptical to account for the different rates. The intermediate gear 134 may be omitted from the invention and the first and second gears 130 and 132 be directly enmeshed, wherein the control lever 146 would be directly attached to the valve stem of one of the valves for controlling the operation of both valves. More than two valves may be interconnected using gears in the manner described herein. The valves may also be interconnected using mechanisms other than gears, such as mechanical or hydraulic linkages, chains, or belts.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A method for providing a continuous supply of filtered lubricant to equipment, the method consisting essentially of:

(a) recovering used lubricant from the equipment;

(b) pumping the used lubricant through a first filter in fluid communication with a pump and with the equipment;

(c) passing the filtered lubricant to the equipment;

(d) redirecting the used lubricant through a second filter in fluid communication with the pump and the equipment when the first filter is removed from service;

(e) alternating the flow of used lubricant through the first filter or the second filter with a valve assembly comprising a first three-way valve upstream from the first filter and the second filter and having a first valve stem and a first gear mounted on the first valve stem, a second three-way valve downstream from the first filter and the second filter and having a second valve stem and a second gear mounted on the second valve stem, and an intermediate gear enmeshed with the first gear and the second gear and configured and positioned to simultaneously operate both the first valve and the second valve when the intermediate gear is rotated to direct the flow of lubricant through one of the first filter and the second filter.

2. A system for providing a continuous supply of filtered oil to equipment, the system comprising:

(a) a pump in fluid communication with a used lubricant outlet from the equipment;

(b) a first filter in fluid communication with a pump outlet and a lubricant inlet to the equipment;

(c) a second filter positioned in the system and adapted for fluid communication with the pump outlet and the lubricant inlet when the first filter is not in service; and (d) a filter switching assembly comprising a first three-way valve in fluid communication with the pump and a lubricant inlet to the first filter and having a first valve stem and a first gear mounted on the first valve stem; a second three-way valve in fluid communication with a lubricant outlet from the first filter and the lubricant inlet to the equipment and having a second valve stem and a second gear mounted on the first valve stem and an intermediate gear engaging the first gear and the second gear and operative to alternatively simultaneously move the first three-way valve into fluid communication with the pump and a lubricant inlet into the second filter and the second three-way valve into fluid communication with a lubricant outlet from the second filter and the lubricant inlet to the equipment or simultaneously move the first three-way valve into fluid communication with the pump and the lubricant inlet into the first filter and the second three-way valve into fluid communication with the lubricant outlet from the first filter and the lubricant inlet into the equipment upon rotation of the intermediate gear.

3. The system of claim 2 wherein the filter switching assembly is enclosed in a housing.

* * * * *